United States Patent [19]

Nishibori et al.

[11] Patent Number: 5,284,604
[45] Date of Patent: Feb. 8, 1994

[54] FLAME RETARDED THERMOPLASTIC COMPOSITION

[75] Inventors: Setuo Nishibori, Ohtsu; Hideto Kondo; Toshikazu Nabeshima, both of Kyoto, Japan

[73] Assignee: Dai-Ichi Kogyo Seiyaku Co., Ltd., Kyoto, Japan

[21] Appl. No.: 880,259

[22] Filed: May 8, 1992

[30] Foreign Application Priority Data

May 9, 1991 [JP] Japan ................................. 3-135547

[51] Int. Cl.$^5$ ................. C08K 5/3465; C08K 5/3417; C08K 3/22; C08L 63/02; C09K 21/10; C09K 21/14

[52] U.S. Cl. ..................................... 252/609; 523/435
[58] Field of Search ......................... 523/435; 252/609

[56] References Cited

U.S. PATENT DOCUMENTS 3,950,306  5/1976  Pews ..................... 524/101
4,710,317 12/1987  Tabata ................... 252/601

FOREIGN PATENT DOCUMENTS 0079941 of 1978 Japan.
0211354 of 1986 Japan.

Primary Examiner—John C. Bleutge
Assistant Examiner—D. R. Wilson
Attorney, Agent, or Firm—Millen, White, Zelano & Branigan

[57] ABSTRACT

Inflammable synthetic thermoplastic resins are rendered flame retarded by incorporating therein to 100 parts by weight thereof from 5 to 50 parts by weight of 2,4,6-tris (2,4,6-tribromophenoxy)-1,3,5-triazine having a melting point ranging between 225°–235° C., from 5 to 50 parts by weight of a bis-tetrabromophthalimide, 0–50 parts by weight of a bromine-containing epoxy polymer having a molecular weight from 1,000 to 50,000 and from 1 to 20 parts by weight of antimony trioxide.

7 Claims, No Drawings

FLAME RETARDED THERMOPLASTIC COMPOSITION

BACKGROUND OF THE INVENTION

This invention relates to a flame retarded thermoplastic composition which is excellent in flame retardancy, heat resistance, light resistance and impact strength.

Thermoplastics have been widely used to fabricate various industrial and household items for their molding capability with ease as well as physical and electrical properties of the molded products. Since most of thermoplastics are inflammable in nature, their use is limited to certain fields unless they are flame retarded.

A variety of flame retardants are known including halogen-containing flame retardants, phosphorous-containing flame retardants, halogen and phosphorous-containing flame retardants and the like. Since thermoplastics have diversified fields of use, it is generally difficult to select a particular flame retardant which would achieve an optimum result in that use. In addition, some of known flame retardants are less compatible with molten thermoplastics, causing bleeding out or darkening of the molded products with time.

Various attempts have been made with limited success to improve these defects by using two or more flame retardants in combination which would compensate for each of their defects. For example, Japanese Laid Open (Kokai) Patent Application No. 79941/1978 discloses a flame retardant system containing a brominated phthalimide. The vrominated phthalimide used, however, has a melting point higher than the molding temperature of most of thermoplastics and, therefore, will not be dispersed uniformly in molten thermoplastics during the molding process. This adversely affects the physical characteristics of molded products significantly.

Japanese Laid Open (Kokai) Patent Application No. 211354/86 discloses a flame retardant system including a bromine-containing epoxy polymer in combination with tetrabromobisphenol A. This system exhibits an improvement in heat resistance, weatherability etc., compared to tetrabromobisphenol A alone. However, the bromine-containing epoxy polymer will not fully react with tetrabromobisphenol A during the molding process and thus the presence of unreacted tetrabromobisphenol A in the molded products can adversely affect the physical characteristics thereof such as heat resistance and weatherability.

It is, therefore, a principal object of the present invention to provide a flame retarded thermoplastic composition which is free from the above disadvantages.

It is another object of the present invention to provide a flame retarded thermoplastic composition having an improved flame retardancy without compromising thermal and mechanical properties of the molded products made therefrom.

SUMMARY OF THE INVENTION

The above and other objects and advantages of the present invention may be accomplished by incorporating to 100 parts by weight of an inflammable thermoplastic synthetic resin from 5 to 50 parts by weight of 2,4,6-tris(2,4,6-tribromophenoxy)-1,3,5-triazine having a melting point ranging between 225°–235° C., from 5 to 50 parts by weight of a bis-tetrabromophthalimide of the formula:

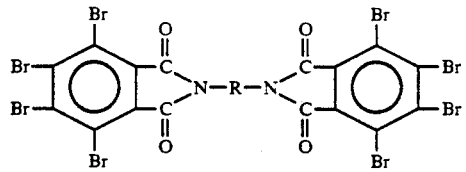

wherein R is an alkylene, haloalkylene, arylene or haloarylene bridge, from 0 to 50 parts by weight of a bromine-containing epoxy polymer having a molecular weight from 1,000 to 50,000, and from 1 to 20 parts by weight of antimony trioxide.

DETAILED DISCUSSION

Examples of inflammable thermoplastic synthetic resins include polyolefin resins such as polyethylene, polypropylene and polybutene; styrene-based polymers such as polystyrene, AS and ABS; polyamides such as nylon 66 and nylon 6; polyesters such as polyethylene- or polybutylene terephthalate; polycarbonate; blends of these polymers and the like.

2,4,6-tris(2,4,6-tribromophenoxy)-1,3,5-triazine (hereinafter referred to as "TBP-TZ") used in the present invention should be pure enough to have a melting point ranging from 225° C. to 235° C. Crude TBP-TZ having a melting point outside the above melting point range will adversely affect various physical properties of molded plastics into which it is incorporated. Such highly pure TBP-TZ may be synthesized, for example, by adding an aqueous solution of tribromophenol (TBP) dropwise to a solution of cyanuric chloride in a non-hydrophilic solvent containing a phase transfer catalyst, allowing the mixture to react for 1–5 hours at a temperature below the boiling point of the solvent, and then purifying the reaction product by a convention method such as evaporation, recrystallization and the like. The melting point of TBP-TZ may slightly vary as usual depending upon the type of measurement instruments but a sharp endothermic peak may be seen within a temperature range from 228° C. to 234° C. in the differential thermal analysis (DTA) of pure TBP-TZ.

Specific examples of bis-phthalimides used in the present invention includes ethylenebis-tetrabromophthalimide propylenebis-tetrabromophthalimide, 1,2-dibromoethylenebis-tetrabromophthalimide, 2,3-dibromobutylenebis-tetrabromophthalimide, hexamethylenebis-tetrabromophthalimide, phenylenebis-tetrabromophthalimide, tetrabromophenylenebis-tetrabromophthalimide, xylylenebis-tetrabromophthalimide and the like. This component is used in the form of finely divided particles having a mean particle size of less than 10 micron.

Bromine-containing epoxy polymers used in the present invention may be produced by reacting brominated bisphenol A such as tetrabromobisphenol A with epichlorohydrin. Also included in the usable epoxy polymers are reaction products of tetrabromobisphenol A epoxy resins thus produced with a monophenol such as tribromophenol, trichlorophenol, pentabromophenol, phenylphenol, tetrabromophynylphenol, octabromophenylphenol and the like. The bromine-containing epoxy polymer should have a molecular weight from 1,000 to 50,000.

Antimony trioxide is commercially available and has been widely used for flame retarding purposes in combination with halogenated flame retardants. Particles having a means size of less than 1.5 micron are preferable.

The proportions of TBP-TZ, bis-tetrabromophthalimide, bromine-containing epoxy polymer and antimony trioxide per 100 parts by weight of the inflammable thermoplastic resin should be from 5 to 50, from 5 to 50, from 0 to 50, and from 1 to 20 parts by weight, respectively. Using these proportions of the various components, a flame retardant premix may be prepared by, for example, dispersing bis-tetrabromophthalimide and antimony trioxide particles in a molten mixture of TBP-TZ and bromine-containing epoxy polymer, cooling and pulverizing or otherwise dividing the resulting solid mixture. Alternatively, the premix may be prepared using a solution of TBP-TZ and bromine-containing polymer instead of molten mixture followed by evaporation to remove the solvent.

The flame retarded thermoplastic composition of the present invention usually takes the form of injection moldable pellets or beads. These pellets or beads may be prepared by any conventional method such as by extrusion-mixing the premix with a thermoplastic resin followed by cutting the extrudate into a desired length. The flame retarded composition may, of course, contain a variety of conventional additives such as antioxidants, UV absorbers, IR absorbers, antistatic agents, inorganic fillers, solvents, plasticizers, crystal nuclei, pigments and the like. The pellets or beads thus produced may be processed into a variety of flame retarded thermoplastic items using any conventional molding technique such as injection molding.

The flame retarded thermoplastic composition of the present invention exhibits improved flame retardancy, heat resistance, light resistance and strength properties because the various flame retardant additive incorporated therein are well compatible or stably dispersible with the resin component thereby acting synergistically to improve these properties.

The following examples are intended to further illustrate the present invention without limiting thereto. All parts and per cents therein are by weight unless otherwise indicated.

Examples 1–4 and Comparative Examples 1–4

100 parts of TBP-TZ and an amount of bromine-containing epoxy resin as indicated in Table 1 below were melted together at 220° C. To this were added an amount of bis-tetrabromophthalimide and an amount of antimony trioxide as indicated in Table 1, respectively. The mixture was uniformly dispersed, cooled down and pulverized. The whole amount of the resulting premix was blended in a vertical mixer with 100 parts of high impact strength polystyrene resin (Estyrene H65, Nippon Steel Chemical Co., Ltd). The blend was extrusion-kneaded through an extruder having an orifice diameter of 20 mm maintained at a constant temperature at 220° C., extruded through a die having an inner diameter of 3 mm into a continuous strand, and then cut into pellets.

A test piece was produced by injection molding the resulting pellets at a molding temperature of 230° C. and tested for flame retardancy and other properties according to the following methods.

Heat resistance

A batch of the composition was retained in the molding machine at 230° C. for 30 minutes before injection molding into the test piece. Color difference between test pieces injected from batches before and after the retention time was determined in terms of $\Delta E$.

Flame retardancy

UL-94 (1/16 inch).

Heat distortion temperature and impact strength

JIS-6871.

Light resistance

The test piece was exposed in a fade-o-meter at 63° C. for 48 hours. Color difference of the test piece before and after the exposure was determined in terms of $\Delta E$.

TABLE 1

| Formulation, parts | Example | | | | Comparative Example | | | |
|---|---|---|---|---|---|---|---|---|
| | 1 | 2 | 3 | 4 | 1 | 2 | 3 | 4 |
| HI Polystyrene Resin | 100 | 100 | 100 | 100 | 100 | 100 | 100 | 100 |
| TBP-TZ [1] | 9.0 | 6.0 | 6.0 | 6.5 | 15.0 | — | — | — |
| Br Phthalimide(A) [2] | 7.5 | 5.5 | 5.5 | 5.5 | 5.5 | — | 16.5 | — |
| TBBA [3] | — | — | — | — | — | — | 17.0 | — |
| Br Epoxy Polymer(A) [4] | — | — | — | 5.0 | — | — | — | — |
| Br Epoxy Polymer(B) [5] | — | — | 5.0 | — | — | — | 6.0 | 23.0 |
| Br Epoxy Polymer(C) [6] | — | 5.0 | — | — | — | — | — | — |
| $Sb_2O_3$ [7] | 5.5 | 5.5 | 5.5 | 5.5 | 5.0 | 5.5 | 5.0 | 5.0 |
| Heat Resistance, $\Delta E$ | 10 | 15 | 16 | 19 | 24 | 16 | 50 | 70 |
| Flame Retardancy | V-0 | V-0 | V-0 | V-0 | V-0 | V-0 | V-0 | V-0 |
| Heat Distortion Temp., °C. | 83.4 | 82.4 | 82.0 | 81.8 | 80.2 | 78.7 | 78.5 | 82.8 |
| Impact Strength, kg cm/cm | 8.4 | 8.0 | 8.3 | 8.5 | 6.1 | 4.9 | 7.3 | 3.7 |
| Light Resistance, $\Delta E$ | 11 | 13 | 14 | 14 | 15 | 14 | 25 | 40 |

Foot note:
[1] M.P. 232° C. measured by TG-DTA instrument sold by Rigaku Denki Co., Ltd.
[2] Ethylenebis-tetrabromophthalimide, mean particle size of 2.0 micron.
[3] Tetrabromobisphenol A monomer.
[4] A tetrabromobisphenol A epoxy resin having an M.W. of 1,500.
[5] A tetrabromobisphenol A epoxy resin having an M.W. of 5,000.
[6] A reaction product of tetrabromobisphenol A epoxy resin and TBBA. M.W. equals 10,000.
[7] Mean particle size equals 1.0 micron.

Examples 5–8 and Comparative Examples 5–7

As in the preceding Examples, various flame retardant premixes were formulated as indicated in Table 2 below, blended with 100 parts of ABS resin (CYCOLAC T, sold by Ube-Cycon Co., Ltd.) respectively, and injected to a test piece. Each of the injected test pieces were tested for its properties under the same test conditions as in the preceding Examples.

TABLE 2

| Formulation, parts | Example 5 | Example 6 | Example 7 | Example 8 | Comparative Example 5 | Comparative Example 6 | Comparative Example 7 |
|---|---|---|---|---|---|---|---|
| ABS Resin | 100 | 100 | 100 | 100 | 100 | 100 | 100 |
| TBP-TZ | 10.0 | 10.0 | 10.0 | 14.0 | 22.5 | — | — |
| Br Phthalimide(B) | 7.0 | 7.0 | 7.0 | 10.0 | — | 24.0 | — |
| TBBA | — | — | — | — | — | — | 16.0 |
| Br Epoxy Polymer(A) | 7.0 | — | — | — | — | — | 8.0 |
| Br Epoxy Polymer(B) | — | 7.0 | — | — | — | — | — |
| Br Epoxy Polymer(C) | — | — | 7.0 | — | — | — | — |
| $Sb_2O_3$ | 8.0 | 8.0 | 8.0 | 8.0 | 7.5 | 8.0 | 8.0 |
| Heat Resistance, $\Delta E$ | 9.6 | 8.2 | 8.0 | 9.8 | 11.5 | 18.2 | 18.7 |
| Flame Retardancy | V-0 | V-0 | V-0 | V-0 | V-0 | V-2 | V-0 |
| Heat Distortion Temp., °C. | 86.5 | 86.8 | 86.8 | 86.4 | 87.0 | 85.9 | 86.5 |
| Impact Strength, kg cm/cm | 19.2 | 18.7 | 18.5 | 19.8 | 14.0 | 13.4 | 13.0 |
| Light Resistance, $\Delta E$ | 5.8 | 5.6 | 5.6 | 5.9 | 6.0 | 8.8 | 7.2 |

Examples 9–12 and Comparative Examples 8–9

The preceding Examples were repeated except that various premixes as shown in Table 3 below were extrusion kneaded with polybutylene terephthalate (PBT) resin (NOVADUR 5010 G-30; Mitsubishi Kasei Corporation) at 250° C. and injection molded to a test piece at a machine temperature of 260° C.

TABLE 3

| Formulation, parts | Example 9 | Example 10 | Example 11 | Example 12 | Comparative Example 8 | Comparative Example 9 |
|---|---|---|---|---|---|---|
| PBT Resin | 100 | 100 | 100 | 100 | 100 | 100 |
| TBP-TZ | 7.5 | 7.5 | 7.5 | 10.0 | 16.5 | — |
| Br Phthalimide(B) | 5.0 | 5.0 | 5.0 | 8.0 | — | 16.5 |
| Br Epoxy Polymer(A) | 4.0 | — | — | — | — | — |
| Br Epoxy Polymer(B) | — | 4.0 | — | — | — | — |
| Br Epoxy Polymer(C) | — | — | 4.0 | — | — | — |
| $Sb_2O_3$ | 5.5 | 5.5 | 5.5 | 6.0 | 5.5 | 5.5 |
| Flame Retardancy | V-0 | V-0 | V-0 | V-0 | V-0 | V-0 |
| Heat Distortion Temp., °C. | 209.6 | 210.4 | 210.7 | 212.5 | 201.6 | 208.7 |
| Impact Strength, kg cm/cm | 12.9 | 12.5 | 12.3 | 10.2 | 9.8 | 6.8 |

Examples 13–16 and Comparative Examples 10–11

The preceding Examples were repeated except that various premixes as shown in Table 4 below were extrusion kneaded with nylon 66 (LEONA 1300G, Asahi Chemical Industry Co., Ltd.) at 280° C. and injection molded to a test piece at a machine temperature of 280° C.

TABLE 4

| Formulation, parts | Example 13 | Example 14 | Example 15 | Example 16 | Comparative Example 10 | Comparative Example 11 |
|---|---|---|---|---|---|---|
| Nylon 66 Resin | 100 | 100 | 100 | 100 | 100 | 100 |
| TBP-TZ | 9.0 | 9.0 | 9.0 | 11.0 | 21.0 | — |
| Br Phthalimide(A) | 7.0 | 7.0 | 7.0 | 10.0 | — | 21.0 |
| Br Epoxy Polymer(A) | 5.0 | — | — | — | — | — |
| Br Epoxy Polymer(B) | — | 5.0 | — | — | — | — |
| Br Epoxy Polymer(C) | — | — | 5.0 | — | — | — |
| $Sb_2O_3$ | 7.0 | 7.0 | 7.0 | 7.0 | 7.0 | 7.0 |
| Flame Retardancy | V-0 | V-0 | V-0 | V-0 | V-0 | V-0 |
| Heat Distortion Temp., °C. | 264.9 | 265.4 | 263.7 | 268.0 | 254.0 | 262.3 |
| Impact Strength, kg cm/cm | 16.0 | 15.6 | 15.2 | 13.3 | 12.3 | 8.2 |

We claim:

1. A flame retardant additive composition for incorporating to inflammable synthetic thermoplastic resins consisting essentially of from 6 to 14 parts by weight of 2,4,6-tris(2,4,6-tribromophenoxy)-1,3,5-triazine having a melting point ranging between 225°–235° C., from 5.5 to 10 parts by weight of a bistetrabromophthalimide of the formula:

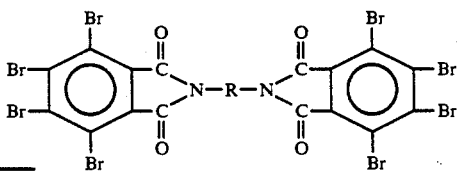

wherein R is an alkylene, haloalkylene, arylene or haloarylene bridge, from 0 to 7 parts by weight of a brominecontaining epoxy polymer having a molecular weight ranging between 1,000 to 50,000 and from 5.5 to 8 parts by weight of antimony trioxide.

2. The flame retardant additive composition according to claim 1, wherein said inflammable synthetic resin is selected from the group consisting of polyolefin resins, styrene-based polymers, polyester resins, polyamides, polycarbonates and blends of these resins.

3. The flame retardant additive composition according to claim 1, wherein said bis-tetrabromophthalimide is ethylenebis-, propylenebis-, 1, 2-dibromoethylenebis-, 2, 3-dibromobutylenebis-, hexamethylenebis-, phenylenebis-, tetrabromophenylenebis-, or xylylenebis-tetrabromophthalimide.

4. The flame retardant composition according to claim 1, wherein said bromine-containing epoxy polymer is a tetrabromobisphenol A epoxy resin or a reaction product thereof with a monofunctional phenol selected from the group consisting of tribromophenol, trichlorophenol, pentabromophenol, phenylphenol, tetrabromophenylphenol and octabromophenylphenol.

5. The flame retardant additive composition according to claim 1, wherein said bis-tetrabromophthalimide is ethylene bis-tetrabromophthalimide.

6. The flame retardant additive composition according to claim 5, which contains said bromine-containing epoxy polymer.

7. The flame retardant additive composition according to claim 6, wherein said thermoplastic resin is an ABS, nylon or polybutylene terephthalate.

* * * * *